United States Patent [19]

Pryor et al.

[11] Patent Number: 5,385,324
[45] Date of Patent: Jan. 31, 1995

[54] QUICK CLAMPING SYSTEM

[75] Inventors: Jeffery W. Pryor, Vista; Jack W. Ratcliff, Carlsbad, both of Calif.

[73] Assignee: Pryor Products, Oceanside, Calif.

[21] Appl. No.: 199,518

[22] Filed: Feb. 22, 1994

Related U.S. Application Data

[63] Continuation of Ser. No. 995,768, Dec. 23, 1992, Pat. No. 5,326,059.

[51] Int. Cl.⁶ ............................................. E04G 5/06
[52] U.S. Cl. ........................... 248/231.7; 248/231.4; 248/316.4
[58] Field of Search .............. 248/231.7, 125, 231.2, 248/231.4, 311.3, 316.4, 316.6, 316.8, 309.1

[56] References Cited

U.S. PATENT DOCUMENTS

| | | | |
|---|---|---|---|
| 3,591,118 | 7/1971 | Gentile et al. | 248/231.7 |
| 4,005,844 | 2/1977 | Richmond | 248/311.3 |
| 4,832,294 | 5/1989 | Eidem | 248/125 |
| 4,832,299 | 5/1989 | Gorton et al. | 248/231.7 |
| 4,844,397 | 7/1989 | Skakoon et al. | 248/231.7 |
| 5,135,191 | 8/1992 | Schmuhl | 248/125 |
| 5,161,764 | 11/1992 | Roney | 248/231.7 |

FOREIGN PATENT DOCUMENTS

| | | | |
|---|---|---|---|
| 0403559 | 6/1966 | Switzerland | 248/231.7 |
| 0020513 | 9/1912 | United Kingdom | 248/231.7 |

*Primary Examiner*—Ramon O. Ramirez
*Attorney, Agent, or Firm*—Brown, Martin, Haller & McClain

[57] ABSTRACT

A quick clamping system has a clamping device for releasable clamping engagement in a clamping direction with a selected support member oriented vertically or horizontally. A support portion on the clamping device projects outwardly from the support member, and has three orthogonally oriented mounting bores projecting inwardly from spaced regions on the outer surface of the support portion such that one of the bores will be upright whatever the orientation of the support member. A carrier for supporting one or more objects, such as medical equipment, has a pin member for selective engagement in the upright mounting bore.

7 Claims, 2 Drawing Sheets

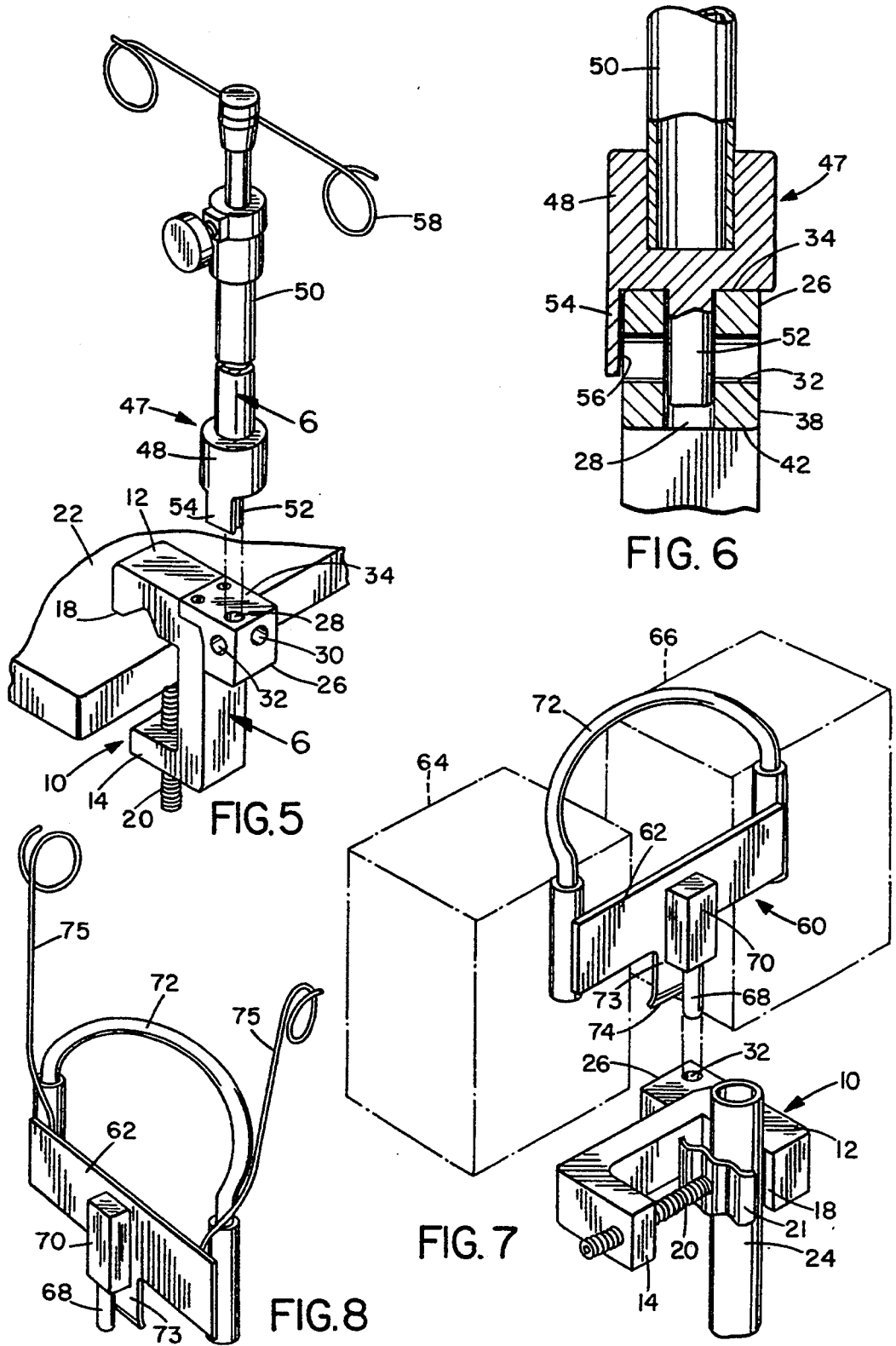

QUICK CLAMPING SYSTEM

This is a continuation of application Ser. No. 07/995,768, filed Dec. 23, 1992, now U.S. Pat. No. 5,326,059.

BACKGROUND OF THE INVENTION

The present invention relates generally to a clamping system for mounting objects on a suitable support which may be a pole, table top, or any other stable support member, and is particularly concerned with a clamping system suitable for mounting medical equipment and the like in a readily accessible fashion.

In the medical field, a large number of instruments and other items are commonly needed for patient monitoring and treatment, both in hospitals and outpatient clinics, as well as for home treatment purposes. The necessary medical equipment must be suitably supported adjacent the patient while in a hospital bed, while the patient is being transported to and from different locations in a hospital or clinic such as an operating room, treatment or diagnostic facility, and while undergoing treatment, for example. Instruments and other items commonly in use adjacent patients include IV bottles and IV pumps, heart monitors, and other treatment and monitoring devices.

IV bottles are normally hung from suitable hangers at the top of telescoping IV pole stands. Medical equipment such as IV pumps may then be clamped to the pole either permanently or temporarily. However, this can make the IV pole unstable since such instruments are typically quite heavy. Also, the heavy pump must be supported with one hand in the proper position while the clamp is secured to the pole, which is relatively difficult and inconvenient for medical personnel. The instrument must be unclamped and moved to a new location repeatedly both when the patient is moved and at the end of a treatment, and also if the instrument malfunctions. Current clamping systems do not allow instruments to be moved from place to place easily.

When a large number of instruments are required for treatment and monitoring purposes, a single IV pole will not provide sufficient support area or stability. However, since the instruments are relatively fragile and it is important that they operate continuously, it is undesirable simply to place them on a table top where they could be knocked off. Current clamping systems are normally designed for securing to one type of support surface in a fixed orientation, which is also not always convenient.

In U.S. Pat. No. 4,832,299 of Gorton et al., for example, a clamp fixture for supporting a medical instrument on a variety of different support structures is described. However, the instrument must be held while the clamp mechanism is engaged, and the mechanism is relatively difficult and complex to use.

SUMMARY OF THE INVENTION

It is an object of the present invention to provide a new and improved clamping system which allows instruments and other objects to be moved quickly and easily from one location to another.

According to the present invention, a clamping system is provided which comprises a clamping device for releasable clamping engagement in a clamping direction on a selected support member of any shape in any horizontal or vertical orientation, the clamping device having a support portion projecting outwardly from the support member, the support portion having three orthogonal bores projecting inwardly from spaced regions on the outer surface of the support portion, one of said bores being oriented parallel to said clamping direction, a carrier for carrying one or more objects to be supported, and a pin member on said carrier for selective engagement in any one of the bores.

The arrangement is such that one of the bores will be facing upwardly and orientated vertically to receive a pin member secured to one or more objects such as medical instruments, regardless of whether the support surface is orientated horizontally or vertically. When the device is clamped onto the edge of a horizontal table top, for example, the bore parallel to the clamping direction will be upright. If the device is clamped onto a vertical IV pole or the like, one of the bores will be upright and parallel to the pole. If the device is clamped on an upright flat surface such as a bed headboard, another bore will be upright.

In a preferred embodiment of the invention, the clamping device is a C-clamp having opposing first and second arms, with the first arm having an inner surface for seating against one side of a support member, and an adjustable locking member such as a locking screw extending through the second arm in the clamping direction for locking engagement with the other side of the support member. The clamp has a square corner region and the orthogonal bores preferably project inwardly from orthogonal faces of the corner region and intersect inside the clamp. Preferably, different types of carriers are provided for carrying equipment such as generally rectangular instrument housings, IV bottles, and so on. One type of carrier comprises an IV hanger upper pole section having a pin member at its lower end, so that the upper section of an IV hanger pole can be mounted on a bed headboard or table top rather than on a vertical IV stand.

A diagonal locking bore may be provided for intersecting the bores obliquely at a cross-over point, and a locking pin may be inserted in the bore to bear against a mounting pin in any one of the mounting bores to restrict rotation of the pin in the bore, for added stability.

This clamping system allows instruments and other objects to be transferred quickly and easily from one support member to another, simply by lifting the object out of the mounting bore in one clamping device and hooking the pin member into a mounting bore in another appropriately positioned clamping device at another desired location.

BRIEF DESCRIPTION OF THE DRAWINGS

The present invention will be better understood from the following detailed description of a preferred embodiment of the invention, taken in conjunction with the accompanying drawings, in which like reference numerals refer to like parts, and in which:

FIG. 5 is a perspective view of the clamping device secured to one type of support with a carrier forming the second part of the clamping system mounted on the clamping device;

FIG. 6 is a section on the lines 6—6 of FIG. 5 showing the carrier mounting pin engaged in a clamping device mounting bore;

FIG. 7 is a perspective view showing an alternative carrier and the clamping device secured to a different type of support; and FIG. 8 is a perspective view showing another alternative carrier.

DESCRIPTION OF THE PREFERRED EMBODIMENT

Figure 1:
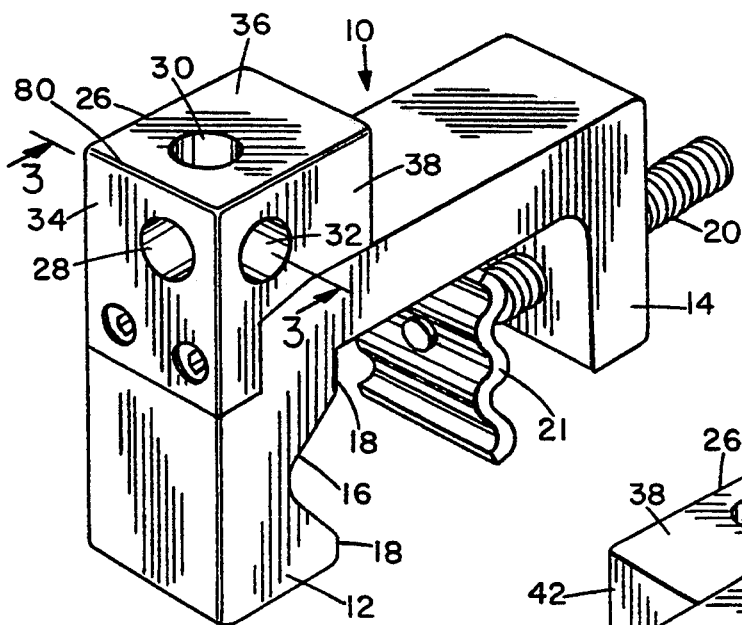
FIG. 1 is a perspective view directed towards one side of a clamping device forming a first part of a quick clamping apparatus according to a preferred embodiment of the present invention.
Figure 2:
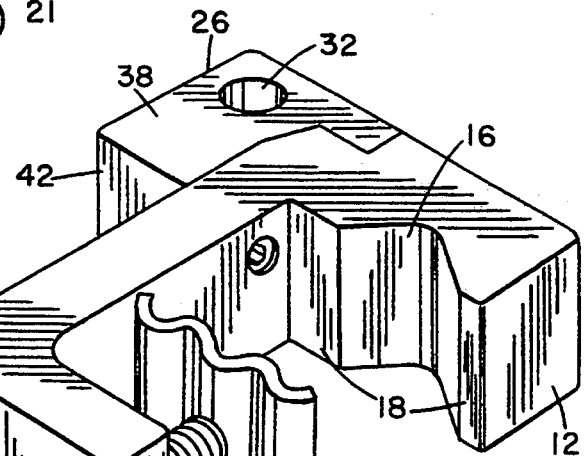
FIG. 2 is a perspective view similar to FIG. 1 showing the device in a different orientation.
Figure 3:
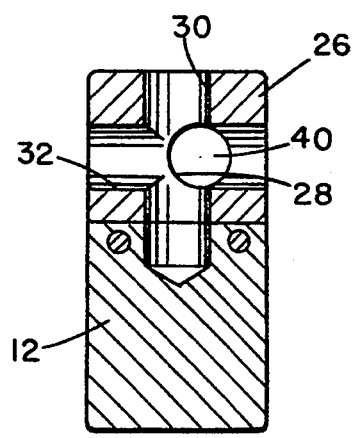
FIG. 3 is a cross-section on the lines 3—3 of FIG. 1.

FIGS. 1-3 illustrate a clamping device 10 forming a first part of the clamping system according to a preferred embodiment of the present invention. As best illustrated in FIGS. 1 and 2, the clamping device 10 basically comprises a C-clamp having opposing first and second arms 12, 14, the first arm 12 having a generally V-shaped recess 16 in an inwardly facing, flat clamping surface 18. A clamping screw 20 extends through a bore in the second arm 14 which is aligned with recess 16. A corrugated or undulating thrust plate 21 is mounted on the end of screw 20. The plate 21 has alternating ridges and grooves.

Figure 4:
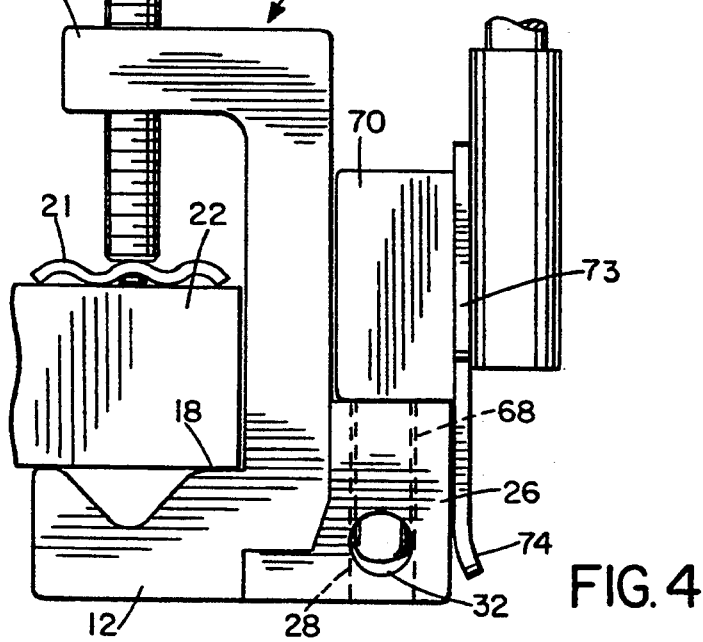
FIG. 4 is a side elevational view showing the device in yet another orientation with a carrier supported on the clamping device.

With this arrangement, the device can be clamped to a flat surface 22 with the flat surface 18 placed against one face of the surface and the thrust plate 21 screwed into clamping engagement with the opposite face, as generally illustrated in FIGS. 4 and 5. Alternatively, as generally illustrated in FIG. 7, the recess 16 can be placed against one side of a vertical or horizontal pole 24 and the thrust plate 21 screwed into clamping engagement with the opposite side of the pole, so that one of the grooves in plate 21 is positioned against the surface of the pole. This can be used to clamp the device securely against any radiused surface, such as a radius or ridge on a bed headboard, or the edge of a table. Thus, the clamping device can be secured to any support member of round or other shape, whether orientated vertically or horizontally. This will give a large choice of appropriate clamping surfaces in any typical home, hospital, clinic or office environment.

The waffle plate is removably mounted on the end of screw 20, for example via snap engagement. This allows the plate to be removed if the clamp is to be installed through a small opening, for example between the rails of a bed headboard. Screw 20 has an Allen head to reduce the risk of accidental loosening.

The device has a projecting square mounting portion 26 which projects outwardly in the opposite direction to clamping arm 12. Mounting portion 26 may be molded in one piece with the C-clamp, or may be formed as a separate part which is secured to the C-clamp with screws or the like. Three orthogonal mounting bores 28, 30, 32 project orthogonally to one another inwardly from perpendicular faces 34, 36, 38 respectively of the portion 26, the bores intersecting at a crossover region 40, as best illustrated in FIG. 3. A first one of the bores 28 extends parallel to the clamping direction defined by the axis of clamping screw 20, while the other two bores 30 and 32 extend in perpendicular directions transverse to the clamping direction. Bores 28 and 32 are through bores extending through the thickness of mounting portion 26, as best illustrated in FIGS. 1, 3 and 4, while bore 30 is a blind bore. Bore 28 may be a blind bore or may extend through the mounting portion 26 to the other face 42, as illustrated in FIG. 4.

Although this is not essential, a locking bore (not illustrated) may be provided to project diagonally inwardly from one corner of the mounting portion 26 so as to intersect the three mounting bores in the crossover region 40. A suitable locking or retaining screw may be adjustably mounted in the locking bore, and may be adjusted inwardly into a locking position if desired.

The second part of the clamping system basically comprises a carrier or mounting device for mounting an instrument on the clamping device 10, using any one of the bores. The carrier is suitably secured to a medical instrument or other device to be supported. FIGS. 4, 5, and 8 illustrate alternative versions of the carrier or mounting device, which may be used interchangeably with the clamping device 10 of FIGS. 1-3. As illustrated in FIG. 5, the mounting device or carrier 47 comprises the upper part 50 of a telescoping IV pole assembly having a mounting sleeve 48 mounted at its lower end. An antirotation pin (not illustrated) may extend transversely through sleeve 48 to engage an opening in the lower end of part 50. The sleeve has a mounting pin 52 projecting from its lower face for engagement in any one of the mounting bores 28, 30 or 32. Sleeve 48 has a partial extension 54 projecting downwardly to one side of pin 52, the extension 54 having a flat inner face 56.

If the clamping device 10 is clamped onto a suitable horizontal surface such as a table top, as illustrated in FIG. 5, bore 28 which is parallel with the clamping direction will face upwardly. The pin 52 of mounting sleeve 48 can then easily be aligned with bore 28 as illustrated in FIG. 5, and lowered to engage in the bore as illustrated in FIG. 6, supporting the IV pole section on the table top. The inner face 56 of extension 54 will engage against the outer flat surface 38 of the projection 26 to prevent rotation of the pole section 50. Thus, IV bottles can be suspended from hangers 58, and other medical instruments may also be clamped onto pole section 50 if desired. The clamping device may be clamped onto a horizontal surface or bar either as illustrated in FIG. 5 with the first arm 12 of the clamp uppermost, or reversed as generally illustrated in FIG. 4 with arm 12 lowermost.

The clamping device 10 may alternatively be clamped onto a vertical flat surface, in the orientation illustrated in FIG. 1, in which case bore 30 would be upright and pin 52 could be lowered into bore 30 in a similar fashion. Device 10 may also be clamped onto a vertical or horizontal rod or other shaped support in a similar manner. FIGS. 2 and 7 illustrate the orientation of the clamping device for clamping onto a vertical pole 24. In this orientation, bore 32 is upright. Thus, there are four basic possible clamp mounting positions, as illustrated in FIG. 1, FIG. 2, FIG. 4 and FIG. 5, respectively.

The pole section 50 may be moved quickly and easily from clamping device 10 to another clamping device situated elsewhere, simply by lifting it up out of bore 28. Since it is not necessary to have a hand free for securing any clamping device, both hands can be used to carry and mount pole section 50, making transfer relatively easy even when heavy equipment is mounted on the pole.

With this arrangement, when a patient in a bed has to be moved using a mobile stretcher unit or wheelchair, any IV bottles and pumps can be moved quickly and easily to be mounted on a suitable support member on the stretcher unit or wheelchair, simply by first clamping a clamping device 10 at an appropriate location on the chair back or stretcher support rod, and then lifting pole section 50 and lowering pin 52 into the appropriate mounting bore. The device is self-aligning and does not have to be orientated in any specific way before mounting, since one of the bores will always be facing upwards whatever support surface is used. This makes the clamping system extremely easy and quick to use, which can be very important in a medical environment where quick transfer of patients is critical in an emergency situation.

FIG. 7 illustrates an alternative carrier for use in the clamping system. In this version, the mounting device or carrier 60 of the clamping system basically comprises a bracket or T-plate 62 secured between the rear faces of two instruments 64, 66, and a pin member 68 projecting downwardly from a support flange or rectangular pin block 70 on the outer face of bracket 62 for engagement in a suitable bore in a clamping device 10. The instruments may both be single channel IV pumps, for example, or a pump and a monitor, or any other combination of instruments. A handle 72 extends upwardly between the opposite ends of bracket 62 for convenient transportation of the two instruments from one clamping device to another.

With this arrangement, the two instruments 64, 66 may be supported on a clamping device 10 clamped to a vertical pole or member such as an IV pole, for example, or on a clamping device secured to a table top as in FIG. 4 or FIG. 5, or on a clamping device secured on any other convenient vertical or horizontal support member. In the arrangement illustrated in FIG. 7, mounting bore 32 is upright and pin member 68 is aligned with this bore and lowered into engagement with the bore while gripping handle 72. The depending tail portion 73 of T-bracket 62 will engage the outer surface 36 of the support portion 26 to prevent rotation of the instruments. Tail portion 73 has a lower edge 74 which is bent outwardly away from pin 68 for ease in mounting the device on the support portion a clamp. The handle 72 allows the two instruments to be transferred quickly and easily between clamping devices 10 in different locations. As noted above, the instruments may be two single channel IV pumps, which may be preferable to a single dual channel pump, since all pumping action is lost if a single, dual channel pump fails, whereas if two single channel pumps are used one pumping channel will still be available even if one pump fails.

Where carrier 60 is to be supported on a horizontal surface or bar, the clamping device is preferably orientated as illustrated in FIG. 4 with clamp arm 12 lowermost. This defines an upwardly-facing, part-rectangular recess between the flat upper surface of projection 26 and the adjacent outer face of the C-clamp. The pin block 70 is dimensioned for mating engagement with this recess, as illustrated in FIG. 4. This provides additional stability when heavy instruments are secured to carrier 60.

The positioning of the bores 28, 30 and 32 on the mounting section 26 is arranged so that the carriers can only be hooked into the upwardly-facing bore in certain orientations for each orientation of the clamping device. As best illustrated in FIG. 1, bore 30, which is uppermost when the device is secured over an upright planar member such as a headboard, is positioned closest to edge 80 of face 36. This ensures that a carrier can only be hooked over this edge, away from the headboard.

Two or more instruments may be secured together and provided with a single mounting pin in this fashion, so that groups of instruments can be transferred together as a single unit rather than having to transfer each individual instrument separately. Alternative mounting devices may be provided for securing a mounting pin on a single instrument housing, for example, in a similar manner to the dual instrument mounting of FIG. 7 but with a mounting bracket secured to the rear or side face of one instrument housing only.

FIG. 8 illustrates a modification to mounting device 60. In this modified version, two IV hangers 75 are secured to opposite ends of T-plate 62. The mounting device in FIG. 8 is otherwise identical to that of FIG. 7, and like reference numerals have been used as appropriate.

The clamping system described above is extremely versatile and allows medical instruments and other objects to be transferred quickly and easily from one support to another, so that they can be supported on any convenient horizontal or vertical support using the same basic clamping device and mounting pin.

Although a preferred embodiment of the invention has been described above by way of example only, it will be understood by those skilled in the field that modifications may be made to the disclosed embodiment without departing from the scope of the invention, which is defined by the appended claims.

We claim:

1. An apparatus for mounting objects to be supported on a selected support, comprising:
    a flat mounting plate for securing to an object to be supported;
    a pin block projecting outwardly from one face of said mounting plate, and a pin projecting downwardly from said pin block in a direction parallel to the plane of said mounting plate for engagement in a corresponding hole on a selected support said mounting plate comprising means for bearing against a surface of said support to prevent rotation of said pin in said hole.

2. The apparatus as claimed in claim 1, wherein the mounting plate has opposite ends and IV hangers project upwardly from opposite ends of said plate.

3. The apparatus as claimed in claim 1, including a cylindrical sleeve having a first end for telescopic sliding engagement with a tubular member to be supported, and an opposite, closed second end, said pin projecting coaxially from said second end of said sleeve, and said plate projecting from said second end at a location spaced from said pin.

4. The apparatus as claimed in claim 1 including a support member for releasably supporting an object secured said mounting plate, the support member having perpendicular horizontal and vertical surfaces, and a mounting bore projecting inwardly from said horizontal surface in a direction parallel to said vertical surface and spaced a predetermined distance from said vertical surface, said pin and mounting plate being spaced apart by a spacing substantially equal to said predetermined distance, and said pin comprising means for extending into said bore with said mounting plate bearing against said vertical surface to prevent rotation of said pin in said bore.

5. The apparatus as claimed in claim 1, including a pair of instrument housings, the mounting plate comprising a mounting bracket extending between the instrument housings and securing them together.

6. The apparatus as claimed in claim 5, including a handle extending between opposite ends of the mounting bracket.

7. The apparatus as claimed in claim 1, wherein said mounting plate comprises a flat plate secured to at least one instrument housing.

* * * * *